United States Patent
Chen (10) Patent No.: US 8,963,526 B2
(45) Date of Patent: Feb. 24, 2015

(54) VOLTAGE CONVERSION CIRCUIT AND ELECTRONIC SYSTEM USING THE SAME

(71) Applicant: Anpec Electronics Corporation, Hsinchu (TW)

(72) Inventor: Chih-Ning Chen, Taipei (TW)

(73) Assignee: Anpec Electronics Corporation, Hsinchu (TW)

( * ) Notice: Subject to any disclaimer, the term of this patent is extended or adjusted under 35 U.S.C. 154(b) by 0 days.

(21) Appl. No.: 14/078,720

(22) Filed: Nov. 13, 2013

(65) Prior Publication Data

US 2015/0028828 A1    Jan. 29, 2015

(30) Foreign Application Priority Data

Jul. 29, 2013 (TW) .............................. 102127077 A (51) Int. Cl.
*G05F 1/40* (2006.01)
*G05F 1/59* (2006.01)
*H02M 3/158* (2006.01)

(52) U.S. Cl.
CPC *G05F 1/59* (2013.01); *H02M 3/158* (2013.01)
USPC ....................................................... 323/282

(58) Field of Classification Search
USPC ........................... 323/265, 268, 282–285, 351
See application file for complete search history.

(56) References Cited

U.S. PATENT DOCUMENTS

| | | | | |
|---|---|---|---|---|
| 2,930,907 A * | 3/1960 | Slobodzinski | ................ | 327/220 |
| 2,963,592 A * | 12/1960 | De Graaf | ....................... | 327/482 |
| 3,739,257 A * | 6/1973 | Hunter | .......................... | 323/248 |
| 3,771,039 A * | 11/1973 | Stewart | ......................... | 320/140 |
| 7,180,758 B2 * | 2/2007 | Lincoln et al. | ............. | 363/56.01 |
| 7,746,042 B2 * | 6/2010 | Williams et al. | .............. | 323/223 |
| 8,035,364 B2 * | 10/2011 | Williams | ...................... | 323/282 |
| 2014/0157015 A1 * | 6/2014 | Zhan et al. | ..................... | 713/320 |

* cited by examiner

*Primary Examiner* — Adolf Berhane
(74) *Attorney, Agent, or Firm* — Rosenberg, Klein & Lee (57) ABSTRACT

A voltage conversion circuit is disclosed. The voltage conversion circuit includes an inductor, a first switch transistor, a second switch transistor, a first resistor, a second resistor and a P type transistor. When an input voltage is larger than an output voltage and a switch signal is transited to low voltage level, a control signal is a clamping voltage and the P type transistor enters into a saturation region, so that a drain voltage of the first switch transistor is a sum of the clamping voltage and a source-gate voltage of the P type transistor. When an output voltage is larger than an input voltage and a switch signal is changed to low voltage level, the control signal is the switch signal and the P type transistor enters into a linear region, so that a drain voltage of the first switch transistor is sum of the output voltage and voltage-drop of the P type transistor.

10 Claims, 5 Drawing Sheets

VOLTAGE CONVERSION CIRCUIT AND ELECTRONIC SYSTEM USING THE SAME

BACKGROUND OF THE INVENTION

1. Field of the Invention

The instant disclosure relates to a voltage conversion circuit; in particular, to the voltage conversion circuit with boost and buck.

2. Description of Related Art

With a continuous advancement of the electronic technology, demands of electronic-related products have been increased for people. In order to provide people with inexpensive goods, how to effectively save the volume of electronic products has become an important issue for electronic product designers. Because the general electronic devices need a plurality of powers to be served as a work voltage and for the reason of avoiding a plurality of voltage converter to provide power of different voltage, a power converter become the most popular power supply device for designers.

The electronic device usually comprises different components, and operating voltages of each component are different. Therefore, the electronic device is able to achieve regulation of the voltage level through a DC-to-DC voltage conversion circuit, and make the voltage be stable at a preset voltage value. According to different power requirements, it may be extended to many different types of DC-DC voltage conversion circuit, e.g. Buck/Step Down Converter and Boost/Step Up Converter. Furthermore, buck/step down converter may make the DC voltage of the input terminal decrease to a preset voltage level, and boost/step up converter may elevate DC voltage of the input terminal. There are many cases of buck/step down converter or boost/step up converter have already evolved for adapting different architecture or meeting different demands as evolution of the circuit technology.

SUMMARY OF THE INVENTION

The instant disclosure provides a voltage conversion circuit. The voltage conversion circuit comprises an inductor, a first switch transistor, a second transistor, a first resistor, a second resistor and a P type transistor. One terminal of the inductor is electrically connected to an input voltage. A drain of the first switch transistor is connected to another terminal of the inductor, a gate of the first switch transistor is connected to a switch signal and determines switched-on or switched-off state itself according to the switch signal, and a source of the first switch transistor is connected to a ground voltage. A drain of the second transistor is connected to another terminal of the inductor, and a gate of the second transistor is connected to the switch signal, wherein switched-on or switched-off state of the second transistor is opposite to those of the first switch transistor. One terminal of the first resistor is connected to a source of the second switch transistor, and another terminal of the first resistor is connected to a clamping voltage. One terminal of the second resistor is connected to another terminal of the first resistor, and another terminal of the second resistor is connected to one terminal of an output capacitor and outputs an output voltage, wherein another terminal of the output capacitor is connected to the ground voltage. A source of the third transistor is connected another terminal of the inductor, a gate of the third transistor receives a control signal and accordingly determines whether to enter into a saturation region or a linear region, and a drain of the third transistor is connected to one terminal of the output capacitor. When the input voltage is larger than the output voltage and voltage level of the switch signal is changed from high voltage level to low voltage level, the control signal is the clamping voltage and the P type transistor enters into the saturation region, so that a drain voltage of the first switch transistor is sum of the clamping voltage and a source-gate voltage of the P type transistor. When the input voltage is smaller than the output voltage and voltage level of the switch signal is changed from high voltage level to low voltage level, the control signal is the switch signal and the P type transistor enters into a linear region, so that a drain voltage of the first switch transistor is sum of the output voltage and voltage-drop of the P type transistor.

In an embodiment of the instant disclosure, the voltage conversion circuit comprises a voltage comparator and a multiplexer. A first input terminal of the voltage comparator receives output voltage, and a second input terminal of the voltage comparator receives the input voltage. The voltage comparator compares the output voltage and the input voltage and then transmits a digital signal with a comparison result at an output terminal. The multiplexer is electrically connected to the voltage comparator, the gate of the P type transistor, the gate of the first switch transistor and the clamping voltage. The multiplexer selectively transmits one of the switch signal and the clamping voltage to the gate of the P type transistor for being served as the control signal according to the digital signal.

In an embodiment of the instant disclosure, when the input voltage is larger than the output voltage, the voltage comparator transmits the digital signal with low voltage level to the multiplexer, so that the multiplexer chooses the clamping voltage according to the digital signal and transmits the clamping voltage to the gate of the P type transistor so as to make the P type transistor enter into the saturation region.

In an embodiment of the instant disclosure, when the input voltage is smaller than the output voltage, the voltage comparator transmits the digital signal with high voltage level to the multiplexer, so that the multiplexer chooses the switch signal according to the digital signal and transmits the switch signal to the gate of the P type transistor so as to make the P type transistor enter into the linear region.

In an embodiment of the instant disclosure, when voltage level of the switch signal is high voltage level, an inductor current flows through the inductor and the first switch transistor, and the inductor stores an inductor energy, wherein when voltage level of the switch signal is low voltage level, the inductor energy stored in the inductor is transmitted to the output capacitor via the P type transistor.

The instant disclosure provides an electronic system. The electronic system comprises a voltage conversion circuit and a load. The voltage conversion circuit receives an input voltage and transforms the input voltage to an output voltage, wherein the input voltage is smaller than the output voltage or the input voltage is larger than the output voltage. The load is connected to the voltage conversion circuit, and the load receives the output voltage. The voltage conversion circuit comprises an inductor, a first switch transistor, a second transistor, a first resistor, a second resistor and a P type transistor. One terminal of the inductor is electrically connected to an input voltage. A drain of the first switch transistor is connected to another terminal of the inductor, a gate of the first switch transistor is connected to a switch signal and determines switched-on or switched-oft state itself according to the switch signal, and a source of the first switch transistor is connected to a ground voltage. A drain of the second transistor is connected to another terminal of the inductor, and a gate of the second transistor is connected to the switch signal, wherein switched-on or switched-oft state of the second transistor is opposite to those of the first switch transistor. One terminal of the first resistor is connected to a source of the second switch transistor, and another terminal of the first resistor is connected to a clamping voltage. One terminal of the second resistor is connected to another terminal of the first resistor, and another terminal of the second resistor is connected to one terminal of an output capacitor and outputs an output voltage, wherein another terminal of the output capacitor is connected to the ground voltage. A source of the P type transistor is connected another terminal of the inductor, a gate of the P type transistor receives a control signal and accordingly determines whether to enter into a saturation region or a linear region, and a drain of the P type transistor is connected to one terminal of the output capacitor. When the input voltage is larger than the output voltage and voltage level of the switch signal is changed from high voltage level to low voltage level, the control signal is the clamping voltage and the P type transistor enters into the saturation region, so that a drain voltage of the first switch transistor is sum of the clamping voltage and a source-gate voltage of the P type transistor. When the input voltage is smaller than the output voltage and voltage level of the switch signal is changed from high voltage level to low voltage level, the control signal is the switch signal and the P type transistor enters into a linear region, so that a drain voltage of the first switch transistor is sum of the output voltage and voltage-drop of the P type transistor.

In summary, the voltage conversion circuit and the electronic system using the same provided by the instant disclosure is able to effectively reduce conduction resistor of the transistor and layout area, and thus reduce energy consumption of the voltage conversion so as to increase efficiency of the voltage conversion.

For further understanding of the instant disclosure, reference is made for the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the present disclosure. As used herein, the term "and/or" includes any and all combinations of one or more of the associated listed items.

[Embodiment of the Voltage Conversion Circuit]

Figure 1:
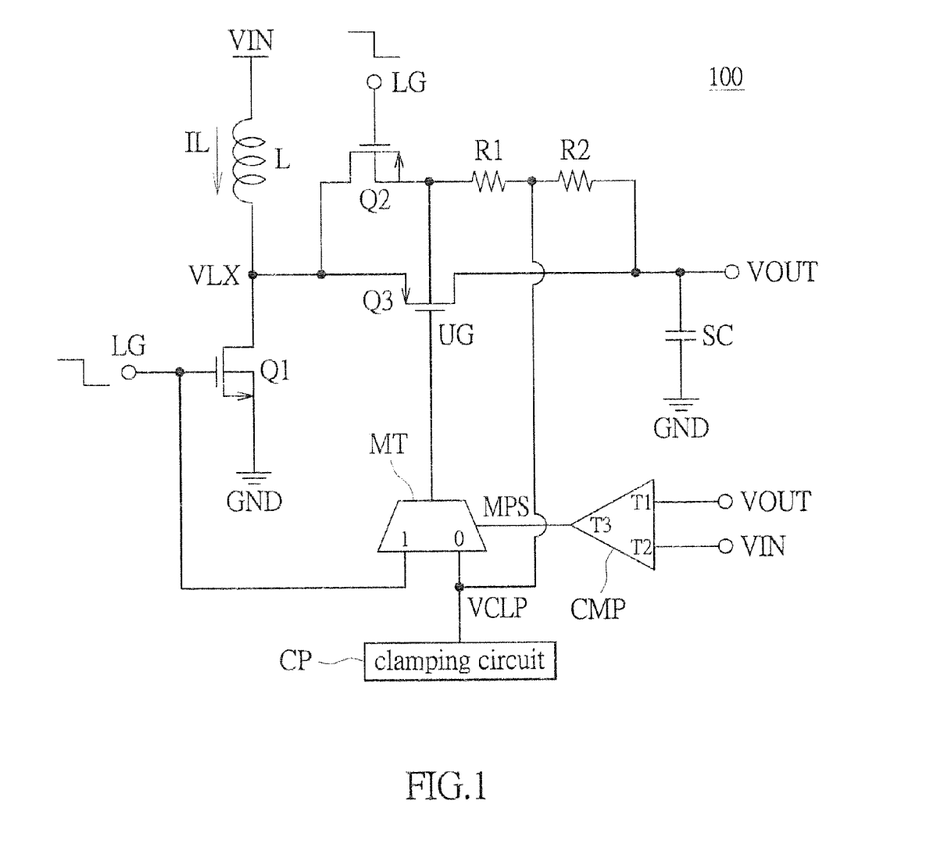
FIG. 1 shows block schematic view of the voltage conversion circuit according to the embodiment of the instant disclosure.

Referring to FIG. 1, FIG. 1 shows block schematic view of the voltage conversion circuit according to the embodiment of the instant disclosure. As shown in FIG. 1, the voltage conversion circuit 100 comprises an inductor L, a first switch transistor Q1, a second switch transistor a first resistor R1, a second resistor R2 and a P type transistor Q3 One terminal of the inductor L is electrically connected to the input voltage VIN. A drain of the first switch transistor Q1 is connected to another terminal of the inductor L, a gate of the first switch transistor Q1 is connected to a switch signal LG and determines switched-on or switched-off state of the first switch transistor Q1 itself according to the switch signal LG, and a source of the first switch transistor Q1 is connected to the ground voltage GND. A drain of the second switch transistor Q2 is connected to another terminal of the inductor L, and a gate of the second switch transistor Q2 is connected to the switch signal LG, wherein switched-on or switched-off state of the second switch transistor Q2 is opposite to those of the first switch transistor Q1. Furthermore, in the present embodiment, the first switch transistor Q1 is N type metal oxide semiconductor field effect transistor, the second switch transistor Q2 is P type metal oxide semiconductor field effect transistor. One terminal of the first resistor R1 is connected to the source of the second switch transistor Q2, and another terminal of the first resistor R1 receives a clamping voltage VCLP. One terminal of the second resistor R2 is connected to another terminal of the first resistor R1, and another terminal of the second resistor R2 is connected to one terminal of the output capacitor SC and outputs an output voltage VOUT, wherein another terminal of the output capacitor SC is connected to the ground voltage GND. A source of the P type transistor Q3 is connected to another terminal of the inductor L, a gate of the P type transistor Q3 receives a control signal UG and accordingly enters into a saturation region or a linear region, and a drain of the P type transistor Q3 is connected to one terminal of the output capacitor SC. It is to be noted that, in an exemplary embodiment, voltage conversion circuit 100 further comprises a voltage comparator CMP and a multiplexer MT. The first input terminal T1 of the voltage comparator CMP receives an output voltage VOUT, and the second input terminal T2 of the voltage comparator CMP receives an input voltage VIN, wherein the first input terminal T1 is a positive input terminal and the second input terminal T2 is a negative input terminal. The multiplexer MT is electrically connected to the voltage comparator CMP, the gate of the P type transistor Q3, the gate of the first switch transistor Q1 and the clamping voltage VCLP.

Regarding the voltage comparator CMP, the voltage comparator CMP compares the output voltage VOUT with the input voltage VIN and transmits a digital signal MPS with a comparison result at an output terminal T3 of the voltage comparator CMP.

Regarding the multiplexer MT, the multiplexer MT selectively transmits one of the switch signal and the clamping voltage VCLP to the gate of the P type transistor Q3 for being served as a control signal UG according to the digital signal MPS received. Accordingly, when the output voltage VOUT is larger than the input voltage VIN, the control signal UG received for the P type transistor Q3 is a switch signal LG and the voltage conversion circuit 100 is a boost circuit at this time. When the output voltage is smaller than the input voltage VIN, the control signal UG received for P type transistor Q3 is clamping voltage VCLP and the voltage conversion circuit 100 is a buck circuit at this time.

In the following description is further instruction in teaching a work mechanism of the voltage conversion circuit 100. Respectively, the following two cases will be described in detail. Case 1 for the buck circuit: if the input voltage VIN is larger than the output voltage VOUT. Case 2 for the boost circuit: if the input voltage VIN is smaller than the output voltage VOUT.

Figure 2:
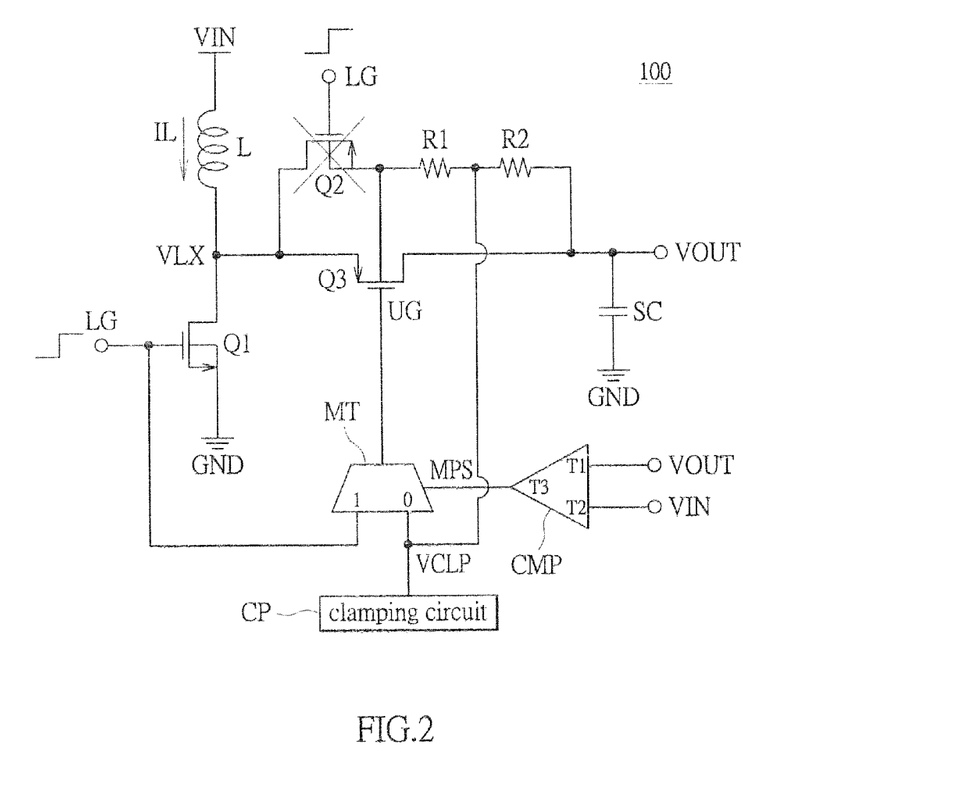
FIG. 2 shows block schematic view of the voltage conversion circuit for storing the inductor energy according to the embodiment of the instant disclosure.

Referring to FIGS. 1-4, when the voltage conversion circuit 100 steps down (i.e. when input voltage VIN is larger than the output voltage VOUT), the comparator CMP transmits the digital signal MPS with low voltage level to the multiplexer MT at the output terminal T3. Next, the multiplexer MT chooses the clamping voltage VCLP according to digital signal received (e.g. digital logic [0]) and transmits the clamping voltage VCLP to the gate of the P type transistor Q3, so that the P type transistor Q3 enters into the saturation region. In detail, between time t0 to time t1, the first switch transistor Q1 and the second switch transistor Q2 receives the switch signal LG with high voltage level, and then the second switch transistor Q2 will be switched-off according to the switch signal LG and the first switch transistor Q1 will be switched-on according to the switch signal LG, so that an inductor current IL is generated and flows through the inductor L and the first switch transistor Q1. Current value of the inductor current IL rise linearly and the energy is stored in the inductor L. As shown in FIG. 2, FIG. 2 shows block schematic view of the voltage conversion circuit for storing the inductor energy according to the embodiment of the instant disclosure.

Figure 3:
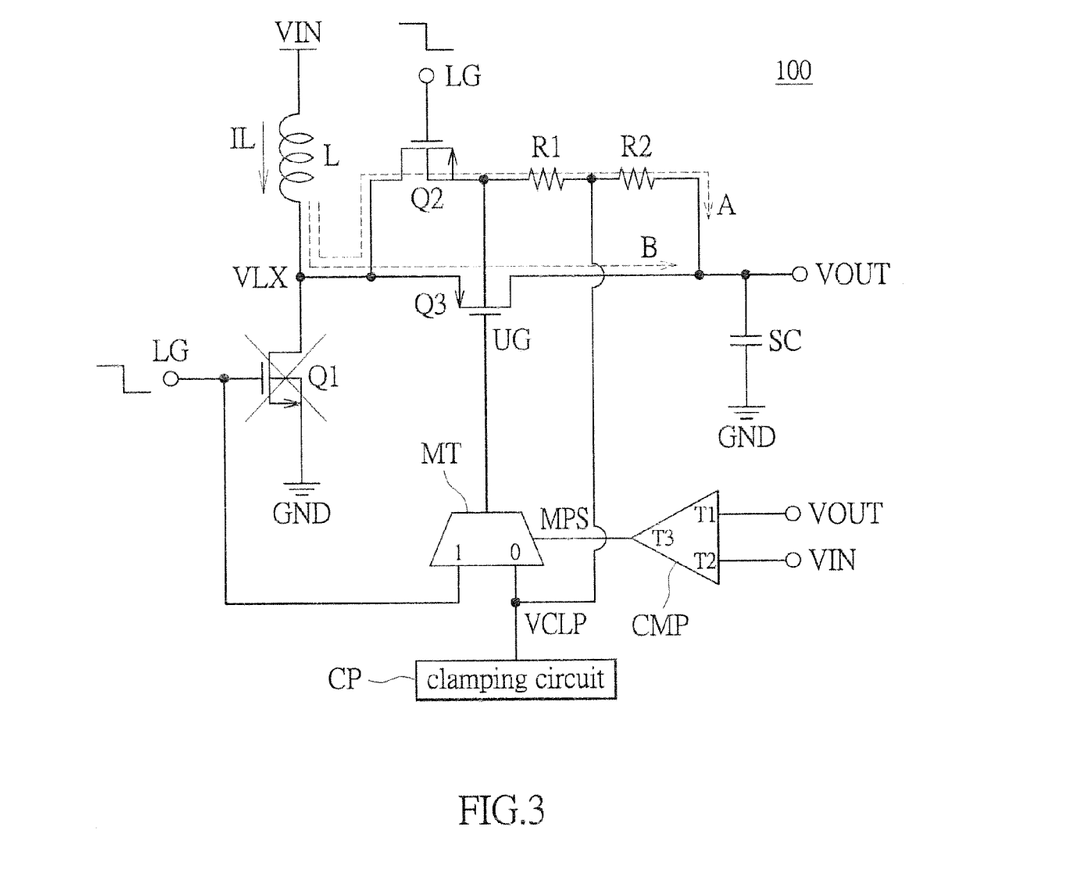
FIG. 3 shows circuit schematic view of the voltage conversion circuit for releasing the inductor energy according to the embodiment of the instant disclosure.

At time t1, the voltage conversion circuit 100 starts to release the inductor energy, so voltage level of the switch signal LG is changed from high voltage level to low voltage level. The first switch transistor Q1 will enter into switched-off state according to the switch signal LG with low voltage level and the second switch transistor Q2 will enter into switched-on state according to the switch signal LG with low voltage level, as shown in FIG. 3. FIG. 3 shows circuit schematic view of the voltage conversion circuit for releasing the inductor energy according to the embodiment of the instant disclosure. Because state of the inductor current IL flowing through the inductor L is continuous, a current path of the inductor current IL may be changed, wherein the current path is current path A in FIG. 3 to the output capacitor SC. In other words, the inductor current IL flows from the second switch transistor Q2, the first resistor R1, the second resistor R2 to the output capacitor SC. Because the inductor energy is leased from the inductor L to the output capacitor SC, current value of the inductor current IL will decrease linearly. In the other hand, in the transient duration of the voltage conversion circuit 100, because the inductor current IL flows through the first resistor R1 and the second resistor R2, voltage at one terminal of the second resistor R2 rises. It is worth being mentioned that, in the present embodiment, because one terminal of the second resistor R2 is connected to clamping voltage VCLP (i.e. the clamping voltage VCLP is larger than the output voltage VOUT), voltage at one terminal of the second resistor R2 is clamped at voltage level equal to the clamping voltage VCLP, wherein the clamping voltage VCLP is generated from the clamping circuit CP. Accordingly, voltage at one terminal of the first resistor R1 (i.e. source voltage of the second switch transistor Q2) is equal to a sum of the clamping voltage VCLP and a voltage-drop of the first resistor R1. Therefore, a drain voltage VLX of the second switch transistor Q2 is equal to a sum of the clamping voltage VCLP and a voltage-drop of the first resistor R1.

Figure 4:
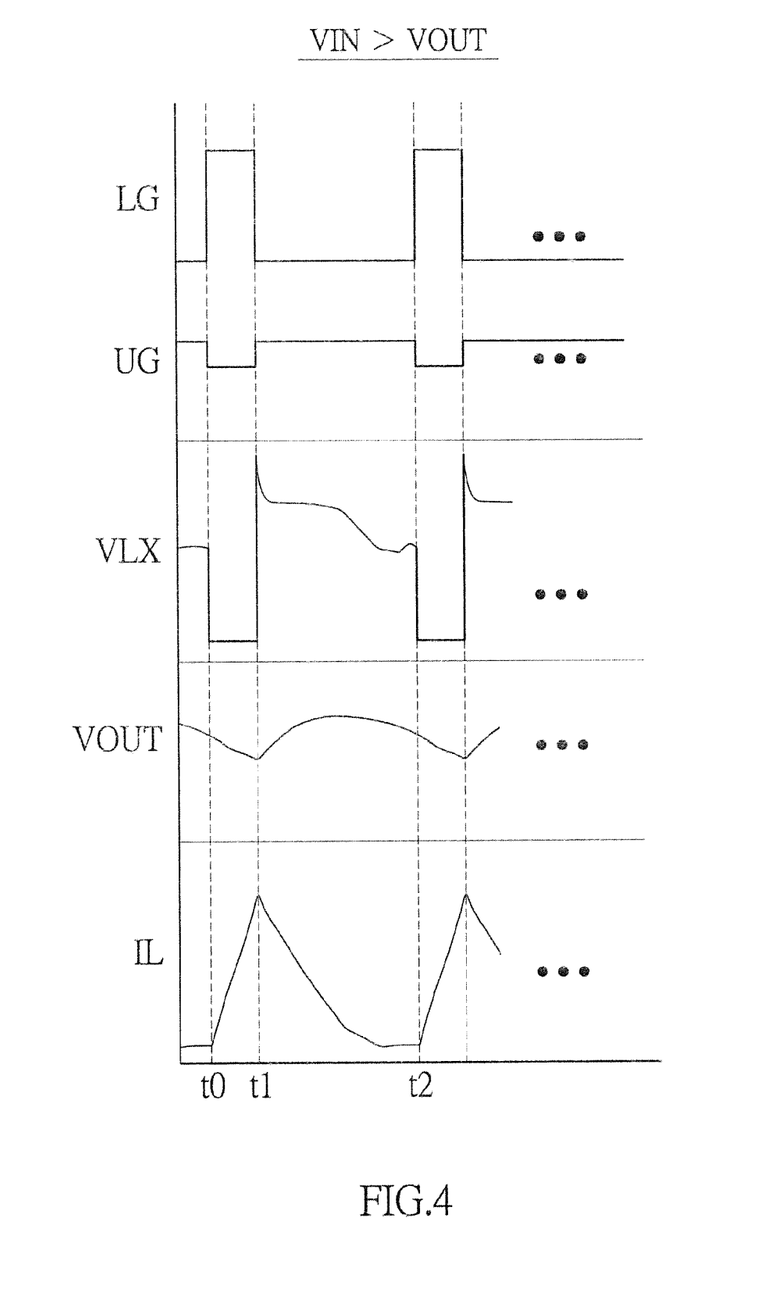
FIG. 4 shows waveform diagram of the voltage conversion circuit according to the embodiment of the instant disclosure.

Next, because the control signal UG received by the gate of the P type transistor Q3 is the clamping voltage VCLP, and a source voltage of the P type transistor Q3 is equal to a drain voltage VLX of the second switch transistor Q2, the P type transistor Q3 enters into the saturation region when voltage-drop of the first resistor R1 is appropriately designed as about 0.7 volt by the designer; which means, source-gate voltage of the P type transistor is at least larger than about 0.7 volt. In one embodiment, drain voltage of the first switch transistor Q1 is a sum of the clamping voltage VCLP and the source-gate voltage of the P type transistor Q3. When the P type transistor Q3 enters into the saturation region, the inductor current IL of the voltage conversion circuit 100 flows a current path B to the output capacitor SC. In the present embodiment, the input voltage VIN is about 3.6 volt and the output voltage VOUT is about 2.5 volt. FIG. 4 shows wave form of the input voltage VIN transformed to the output voltage VOUT, so the voltage conversion circuit 100 of the present embodiment is able to smoothly finish a buck task, wherein FIG. 4 shows wave form diagram of the voltage conversion circuit according to the embodiment of the instant disclosure. Finally, drain voltage VLX of the second switch transistor Q2 and the inductor current IL starts entering into steady-state duration at time t2; which means, the drain voltage VLX of the second switch transistor Q2 will be stabilized at about 3.6 volt and current value of the inductor current IL will decrease to zero current. Accordingly, it represents the inductor energy is totally transformed to the capacitor energy of the output capacitor SC through the P type transistor Q3.

[One Embodiment of the Voltage Conversion Circuit]

Referring to FIG. 1 continuously, when the voltage conversion circuit 100 steps up (i.e. when input voltage VIN is smaller than the output voltage VOUT), the comparator CMP transmits the digital signal MPS with high voltage level to the multiplexer MT at the output terminal 13. Next, the multiplexer MT chooses the switch signal LG according to digital signal received (e.g. digital logic [1]), so that the P type transistor Q3—will be switched-on or switched-off synchronously according to the switch signal LG. In detail, when the first switch transistor Q1, the second switch transistor Q2 and the P type transistor Q3 receive the switch signal LG with high voltage level, the second switch transistor Q2 and the P type transistor Q3 will be switched-off according to the switch signal LG at this time, and the first switch transistor Q1 will be switched-on according to the switch signal LG, so that the inductor current IL is generated and flows through the inductor L and the first switch transistor Q1. Accordingly, current value of the inductor current IL increases linearly and the energy is stored in the inductor L.

Next, when the voltage conversion circuit 100 starts to release the inductor energy, voltage level of the switch signal LG is changed from high voltage level to low voltage level. The first switch transistor Q1 will enter into switched-off state according to the switch signal LG with low voltage level, and the second switch transistor Q2 and the P type transistor Q3 will enter into switched-on state according to the switch signal LG with low voltage level. Because state of the inductor current IL flowing through the inductor L is continuous, the inductor current IL flows from the second switch transistor Q2, the first resistor R1, the second resistor R2 to the output capacitor SC when the first switch transistor Q1 is switched-off. Because the inductor energy is released from the inductor L to the output capacitor SC, current value of the inductor L decreases linearly. Similarly, in the transient duration of the voltage conversion circuit 100, because the inductor current IL flows through the first resistor R1 and the second resistor R2, voltage of one terminal of the second resistor R2 will increase to a voltage level equal to that of the clamping voltage VCLP. Therefore, voltage of one terminal of the first resistor R1 (i.e. the source voltage of the second switch transistor Q2) is equal to a sum of the clamping voltage VCLP and voltage-drop of the first resistor R1.

Afterwards, because the control signal UG received by the gate of the P type transistor Q3 is the switch signal LG, and the source voltage of the P type transistor Q3 (i.e. the drain voltage of the first switch transistor Q1) is equal to a sum of the output voltage VOUT and voltage-drop of the P type transistor Q3, wherein the P type transistor Q3 can be regarded as a conduction resistor when the P type transistor Q3 enters into the linear region. When the P type transistor Q3 enters into the linear region, the inductor current IL flows from the P type transistor Q3 to the output capacitor SC. In the present embodiment, the input voltage VIN is about 2.5 volt and the output voltage VOUT is about 3.6 volt, so that the voltage conversion circuit 100 can smoothly finish boost task. Similarly, when energy of the inductor L is totally transformed to the output capacitor SC, the voltage conversion circuit 100 will enters into the steady-state.

[an Embodiment of the Electronic System]

Figure 5:
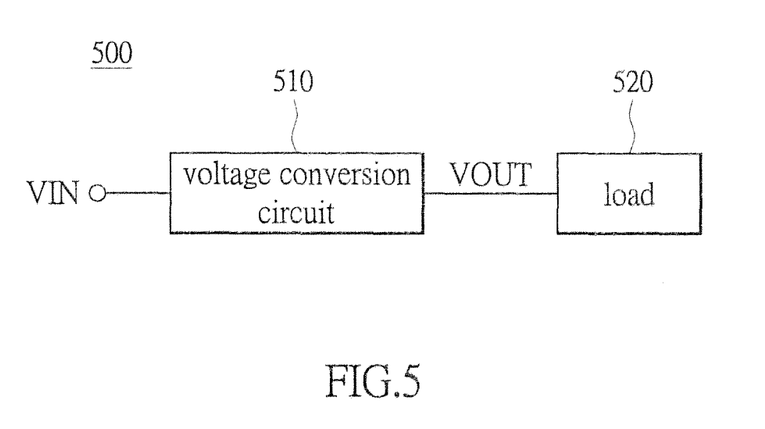
FIG. 5 shows circuit block diagram of the electronic system according to the embodiment of the instant disclosure.

Referring to FIG. 5, FIG. 5 shows circuit block diagram of the electronic system according to the embodiment of the instant disclosure. The electronic system comprises a load 520 and the voltage conversion circuit 510 electrically connected to the load 520, wherein the voltage conversion circuit 510 receives the input voltage VIN and makes the input voltage VIN be transformed to an output voltage VOUT, wherein the input voltage VIN is smaller than the output voltage VOUT or the input voltage VIN is larger than the output voltage VOUT. The input voltage VIN may be a direct voltage or a system voltage generated from a power adapter which receives an alternating current. The voltage conversion circuit 510 may be the voltage conversion circuit 100 of the above-mentioned embodiment in FIG. 1.

To sum up, the voltage conversion circuit and the electronic system using the same provided by the instant disclosure is able to effectively reduce conduction resistor of the transistor and layout area, and thus reduce a manufacturing cost and circuit complexity and energy consumption of the voltage conversion so as to increase efficiency of the voltage conversion.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A voltage conversion circuit, comprising:
an inductor, having one terminal electrically connected to an input voltage;
a first switch transistor, having a drain connected to another terminal of the inductor, having a gate connected to a switch signal and determining switched-on or switched-off state itself according to the switch signal, having a source connected to a ground voltage;
a second transistor, having a drain connected to another terminal of the inductor, having a gate connected to the switch signal, wherein switched-on or switched-off state of the second transistor is opposite to those of the first switch transistor;
a first resistor, having one terminal connected to a source of the second switch transistor, having another terminal connected to a clamping voltage;
a second resistor, having one terminal connected to another terminal of the first resistor, having another terminal connected to one terminal of an output capacitor and outputting an output voltage, wherein another terminal of the output capacitor is connected to the ground voltage; and
a P type transistor, having a source connected another terminal of the inductor, having a gate receiving a control signal and accordingly determining whether to enter into a saturation region or a linear region, having a drain connected to one terminal of the output capacitor,
wherein when the input voltage is larger than the output voltage and voltage level of the switch signal is changed from high voltage level to low voltage level, the control signal is the clamping voltage and the P type transistor enters into the saturation region, so that a drain voltage of the first switch transistor is sum of the clamping voltage and a source-gate voltage of the P type transistor,
wherein when the input voltage is smaller than the output voltage and voltage level of the switch signal is changed from high voltage level to low voltage level, the control signal is the switch signal and the P type transistor enters into a linear region, so that a drain voltage of the first switch transistor is sum of the output voltage and voltage-drop of the P type transistor.

2. The voltage conversion circuit according to claim 1, further comprising:
a voltage comparator, having a first input terminal receiving the output voltage, having a second input terminal receiving the input voltage, the voltage comparator comparing the output voltage and the input voltage and then transmitting a digital signal with a comparison result at an output terminal; and
a multiplexer, electrically connected to the voltage comparator, the gate of the P type transistor, the gate of the first switch transistor and the clamping voltage, and the multiplexer selectively transmitting one of the switch signal and the clamping voltage to the gate of the P type transistor for being served as the control signal according to the digital signal.

3. The voltage conversion circuit according to claim 2, wherein when the input voltage is larger than the output voltage, the voltage comparator transmits the digital signal with low voltage level to the multiplexer, so that the multiplexer chooses the clamping voltage according to the digital signal and transmits the clamping voltage to the gate of the P type transistor so as to make the P type transistor enter into the saturation region.

4. The voltage conversion circuit according to claim 2, wherein when the input voltage is smaller than the output voltage, the voltage comparator transmits the digital signal with high voltage level to the multiplexer, so that the multiplexer chooses the switch signal according to the digital signal and transmits the switch signal to the gate of the P type transistor so as to make the P type transistor enter into the linear region.

5. The voltage conversion circuit according to claim 1, wherein when voltage level of the switch signal is high voltage level, an inductor current flows through the inductor and the first switch transistor, and the inductor stores an inductor energy, wherein when voltage level of the switch signal is low voltage level, the inductor energy stored in the inductor is transmitted to the output capacitor via the P type transistor.

6. An electronic system, comprising:
   a voltage conversion circuit, receiving an input voltage and transforming the input voltage to an output voltage, wherein the input voltage is smaller than the output voltage or the input voltage is larger than the output voltage; and
   a load, connected to the voltage conversion circuit, the load receiving the output voltage,
   wherein the voltage conversion circuit comprises:
   an inductor, having one terminal electrically connected to an input voltage;
   a first switch transistor, having a drain connected to another terminal of the inductor, having a gate connected to a switch signal and determining switched-on or switched-off state itself according to the switch signal, having a source connected to a ground voltage;
   a second transistor, having a drain connected to another terminal of the inductor, having a gate connected to the switch signal, wherein switched-on or switched-off state of the second transistor is opposite to those of the first switch transistor;
   a first resistor, having one terminal connected to a source of the second switch transistor, having another terminal connected to a clamping voltage;
   a second resistor, having one terminal connected to another terminal of the first resistor, having another terminal connected to one terminal of an output capacitor and outputting an output voltage, wherein another terminal of the output capacitor is connected to the ground voltage; and
   a P type transistor, having a source connected another terminal of the inductor, having a gate receiving a control signal and accordingly determining whether to enter into a saturation region or a linear region, having a drain connected to one terminal of the output capacitor,
   wherein when the input voltage is larger than the output voltage and voltage level of the switch signal is changed from high voltage level to low voltage level, the control signal is the clamping voltage and the P type transistor enters into the saturation region, so that a drain voltage of the first switch transistor is sum of the clamping voltage and a source-gate voltage of the P type transistor,
   wherein when the input voltage is smaller than the output voltage and voltage level of the switch signal is changed from high voltage level to low voltage level, the control signal is the switch signal and the P type transistor enters into a linear region, so that a drain voltage of the first switch transistor is sum of the output voltage and voltage-drop of the P type transistor.

7. The electronic system according to claim 6, further comprising:
   a voltage comparator, having a first input terminal receiving the output voltage, having a second input terminal receiving the input voltage, the voltage comparator comparing the output voltage and the input voltage and then transmitting a digital signal with a comparison result at an output terminal; and
   a multiplexer, electrically connected to the voltage comparator, the gate of the P type transistor, the gate of the first switch transistor and the clamping voltage, and the multiplexer selectively transmitting one of the switch signal and the clamping voltage to the gate of the P type transistor for being served as the control signal according to the digital signal.

8. The electronic system according to claim 7, wherein when the input voltage is larger than the output voltage, the voltage comparator transmits the digital signal with low voltage level to the multiplexer, so that the multiplexer chooses the clamping voltage according to the digital signal and transmits the clamping voltage to the gate of the P type transistor so as to make the P type transistor enter into the saturation region.

9. The electronic system according to claim 7, wherein when the input voltage is smaller than the output voltage, the voltage comparator transmits the digital signal with high voltage level to the multiplexer, so that the multiplexer chooses the switch signal according to the digital signal and transmits the switch signal to the gate of the P type transistor so as to make the P type transistor enter into the linear region.

10. The electronic system according to claim 7, wherein when voltage level of the switch signal is high voltage level, an inductor current flows through the inductor and the first switch transistor, and the inductor stores an inductor energy, wherein when voltage level of the switch signal is low voltage level, the inductor energy stored in the inductor is transmitted to the output capacitor via the P type transistor.

* * * * *